United States Patent [19]

Henckel et al.

[11] 4,415,324

[45] Nov. 15, 1983

[54] APPARATUS FOR PRODUCING A MAT OF DIRECTIONALLY ORIENTED LIGNOCELLULOSIC PARTICLES HAVING CROSS-MACHINE ORIENTATION

[75] Inventors: David J. Henckel; Thomas E. Peters, both of Boise, Id.

[73] Assignee: Morrison-Knudsen Forest Products, Inc., Boise, Id.

[21] Appl. No.: 347,375

[22] Filed: Feb. 10, 1982

Related U.S. Application Data

[62] Division of Ser. No. 230,691, Feb. 2, 1981, Pat. No. 4,347,202.

[51] Int. Cl.[3] .......... B29B 5/02

[52] U.S. Cl. .......... 425/83.1; 425/174.8 E

[58] Field of Search .......... 425/174.8 E, 83.1

[56] References Cited

U.S. PATENT DOCUMENTS 4,111,294 9/1978 Carpenter et al. .......... 425/83.1

4,113,812 9/1978 Talbott et al. .......... 425/174.8 E

*Primary Examiner*—James R. Hall

*Attorney, Agent, or Firm*—Seed and Berry

[57] ABSTRACT

An apparatus is disclosed for (1) forming a mat of lignocellulosic particles electrostatically aligned in a cross-machine direction to the direction of movement of the mat being formed, and (2) forming a composite panel having a core layer of particles electrostatically aligned in the cross-machine direction and face layers of particles electrostatically aligned in the machine direction. The multilayered mat of electrostatically aligned particles employs separate orientation cells for aligning the particles in the machine and cross-machine directions. For aligning the particles in the cross-machine direction, a uniformly distributed array of particles is passed through spaced charged plates of a high-voltage electrostatic field having electrical lines of force extending substantially transverse to the direction of movement of the mat being formed. The spaced, charged plates are preferably configured to spread the effects of particle migration and the shadow effect over the area of the orientation to minimize basis weight variation. A nosepiece for the transfer conveyor has a plurality of conductive elements embedded in it extending parallel to the direction of movement of the transfer belt.

15 Claims, 11 Drawing Figures

APPARATUS FOR PRODUCING A MAT OF DIRECTIONALLY ORIENTED LIGNOCELLULOSIC PARTICLES HAVING CROSS-MACHINE ORIENTATION

This is a division of application Ser. No. 230,691, filed Feb. 2, 1981 now U.S. Pat. No. 4,347,202.

DESCRIPTION

1. Technical Field

This invention relates to a apparatus for the formation of a mat of directionally oriented particles of lignocellulosic material such as wood fiber, flakes and strands aligned in a cross-machine direction and to a apparatus for forming an oriented lignocellulosic panel.

2. Background Art

Directional orientation of reconstituted lignocellulosic materials is known in the prior art as, for example, disclosed in U.S. Pat. Nos. 4,113,812 and 4,111,294. These patents disclose electrostatic orientation of lignocellulosic fibrous material in the direction of movement of a mat being formed on a moving horizontal support surface, or caul belt.

U.S. patent application Ser. No. 106,686, filed on Dec. 26, 1979 now U.S. Pat. No. 4,347,202, discloses a continuous method and apparatus for forming an electrostatically oriented mat of discrete particles of lignocellulosic material making use of a transfer surface to transfer a mat of directionally aligned particles to a caul plate. An electrically non-conductive transfer surface is employed for formation of the mat thereupon, which mat is then transferred, with the particles oriented in the direction of movement of the mat being formed, onto a grounded, moving, electrically conductive, mat-receiving surface while still under the influence of an electrostatic field so that the particles do not lose their orientation. The structure disclosed includes multiple electrostatic plates aligned transversely to the direction of movement of the mats being formed. Particles free-fall through the electric field formed between the plates and are aligned along the direction of movement of the mat.

Formation of a mat having particles electrically aligned in the cross-machine or transverse direction to the direction of movement of the mat has not been satisfactorily carried out commercially.

DISCLOSURE OF THE INVENTION

It is an object of this invention to provide an apparatus for electrostatically aligning lignocellulosic particles in a cross-machine direction to the direction of movement of the mat being formed.

It is another object of the invention to provide an apparatus for electrostatically aligning lignocellulosic particles in the cross-machine direction such tht the particles have a minimal basis weight variation over the area of the mat being formed.

It is another object of the invention to provide an apparatus for electrostatically forming a reconstituted mat of lignocellulosic particles in multiple overlying layers, with the particles of each layer being aligned in a different direction.

It is another object of the invention to provide an electrode structure for cross-machine orientation of lignocellulosic particles.

It is a further object of this invention to provide an apparatus for electrostatically aligning lignocellulosic particles by forming a mat of aligned particles on a transfer conveyor having an electrically non-conductive transfer belt trained thearound, and transferring the aligned mat to a moving mat-receiving surface, the transfer conveyor including a nosepiece secured to the discharge end thereof having electrically conductive elements therein arranged to produce an electrical field transverse to the direction of movement of the transfer belt and mat-receiving surface to maintain the orientation of the particles during transfer from the transfer belt to the mat-receiving surface.

In accordance with these and other objects of the invention, an apparatus for aligning lignocellulosic particles in the cross-machine direction and includes means to provide a high-voltage, electrostatic orienting field having electrical lines of force extending substantially transverse to the direction of movement of the mat-receiving surface. A multitude of lignocellulosic particles are cascaded through the orienting zone for electrostatic alignment of their longer dimension generally parallel to the electrical lines of force within the orienting zone. The orienting field may be provided by a series of uniformly spaced, charged electrode plates oriented generally in a direction parallel to the direction of movement of the mat and mat-receiving surface. The charged plates may have a plurality of offset planar portions which are parallel to the direction of movement of the mat or be of the configuration of a chevron or double-chevron, or other suitable shape for minimizing the average angle deviation from the desired cross-machine direction. The particles cascaded through the high-voltage electric field formed between the plates are deposited on an insulated transfer belt of a transfer conveyor beneath the orienting zone formed between the plates and are then transferred by the transfer belt onto a mat-receiving surface.

Apparatus is also disclosed for forming a composite mat of lignocellulosic particles having a core layer aligned in the cross-machine direction and face layers covering both surfaces of the core layer aligned in the machine direction.

A nosepiece for the transfer conveyor is also disclosed, the nosepiece having electrically conductive elements embedded therein to produce an electrical field transverse to the direction of movement of the transfer belt to maintain the orientation of particles aligned in the cross-machine direction during their transfer from the transfer belt to the mat-receiving surface.

BEST MODE FOR CARRYING OUT THE INVENTION

The apparatus described herein is directed particularly to cross-machine orientation of discrete particles of lignocellulosic material, such as flakes, strands, chips, wafers, shavings, slivers, particles, etc. These particles are produced by knife-cutting or impact-disintegration of wood. Other lignocellulosic materials may also be used.

Figure 1:
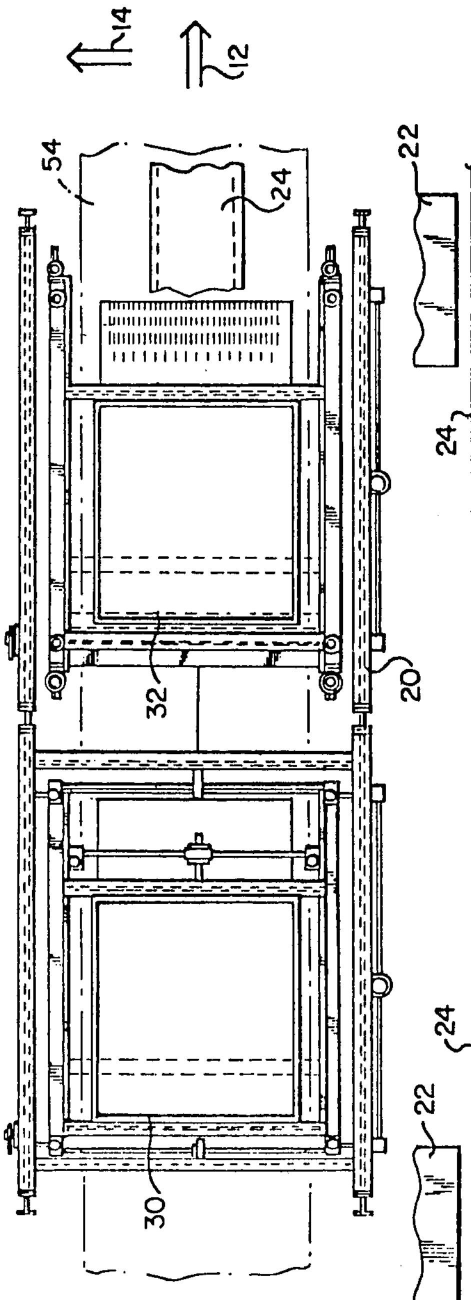
FIG. 1 is a partial plan view of apparatus for forming a multilayered mat of aligned particles having in-line and cross-machine particle orientation.
Figure 2:
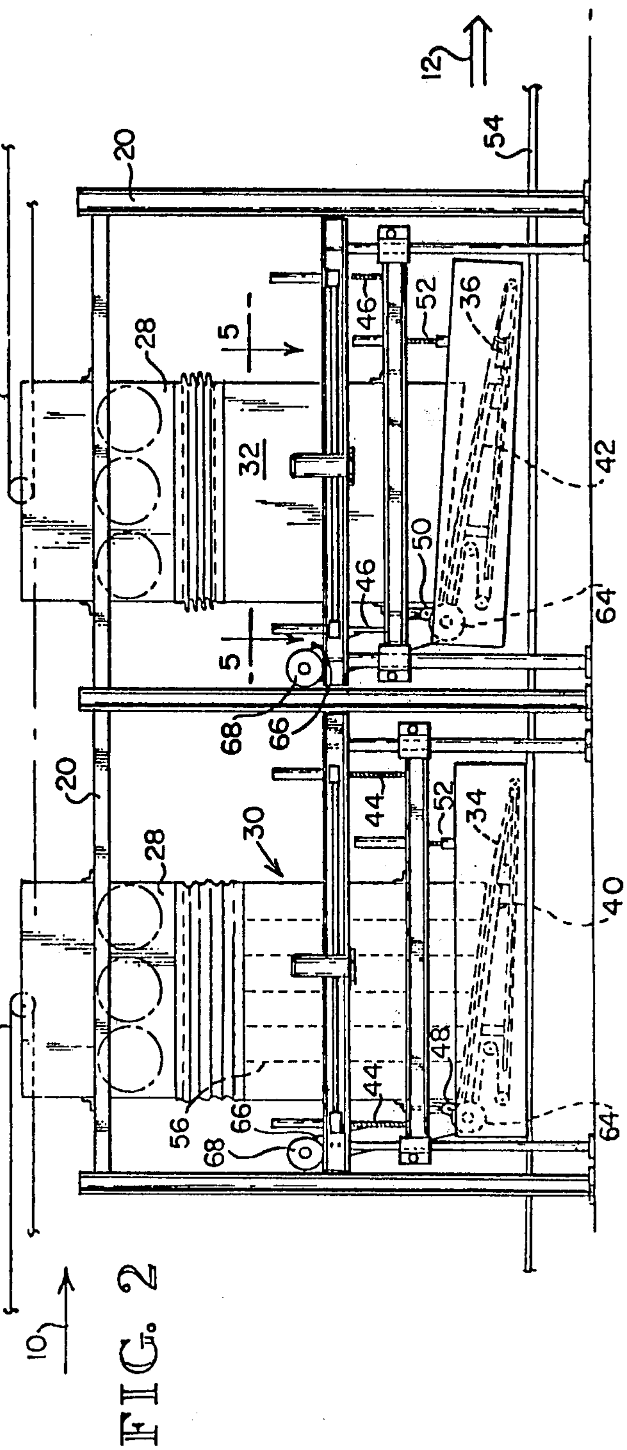
FIG. 2 is an elevation view of the apparatus of FIG. 1.

Referring to FIGS. 1 and 2, an installation 10 for forming of a composite, multilayered mat of electrostatically aligned, lignocellulosic particles is shown. Arrow 12 designates the in-line direction, that is, the direction in which the mat of oriented particles moves as it is being formed. Arrow 14 designates the cross-machine direction, that is, the direction extending peripendicularly or transverse to the in-line direction 12. Only two orientation cells are shown; however, aligned structural panels are generally formed of at least three layers; that is, a core layer oriented in the cross-machine direction and face layers over each surface of the core layers oriented in the machine direction of the panel being formed. Additional formers, machine and cross-machine orientation cells may be provided to produce five, seven, nine or more layers for pressing, if desired. Composite panels composed of veneer faces and an oriented flake-particle core may also be made.

The apparatus is mounted on a support frame structure 20, with the particles to be aligned and formed into mats stored in storage bins 22. The stored particles are metered onto conveyor belts 24. Particle distribution assemblies 28 evenly distribute the particles delivered by the belts 24 over the area inlets to an in-line orientation cell 30 and a cross-machine orientation cell 32. Each of the cells electrostatically orients the particles passing therethrough in the direction of the electric field provided within the respective cell. The oriented particles free-fall through the orientation cells 30, 32 and are deposited on respective transfer belts 34, 36 which run over inclined transfer conveyor decks 40, 42. The transfer decks 40, 42 are insulated so that the mats formed by the oriented particles retain their directional orientation. The transfer belt 34 transfers the mat of aligned particles formed thereon to an electrically conductive, mat-receiving surface or caul 54 which is preferably maintained at ground potential and supported on a continuous conveyor belt driven by suitable power means (not shown). The caul delivers the deposited material beneath the discharge end of transfer belt 36 where a second mat of particles aligned in the cross-machine direction is deposited over the first mat. Additional mats of particles aligned in the machine and cross-machine direction may be laid over the first and second layers, if desired. The resultant multilayered mat is then transferred to a press (not shown) where it is subjected to heat and pressure to form an aligned structural-use panel product composed of multiple layers, some oriented in the long dimension of the panel and some oriented in the short dimension.

Figure 3:
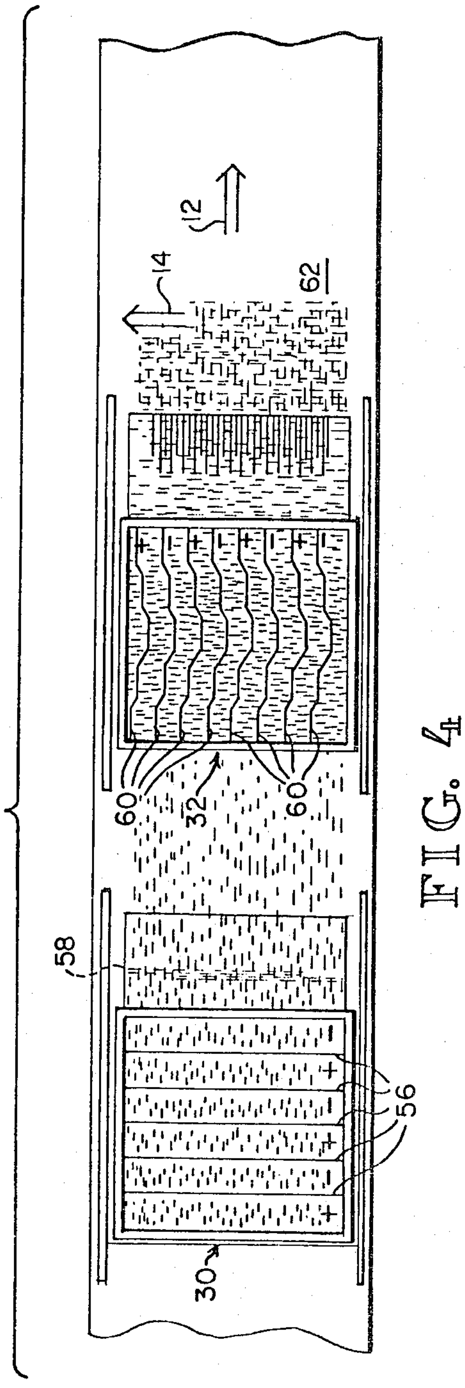
FIG. 3 is a plan schematic view of the orientation cells of FIG. 2.
Figure 4:
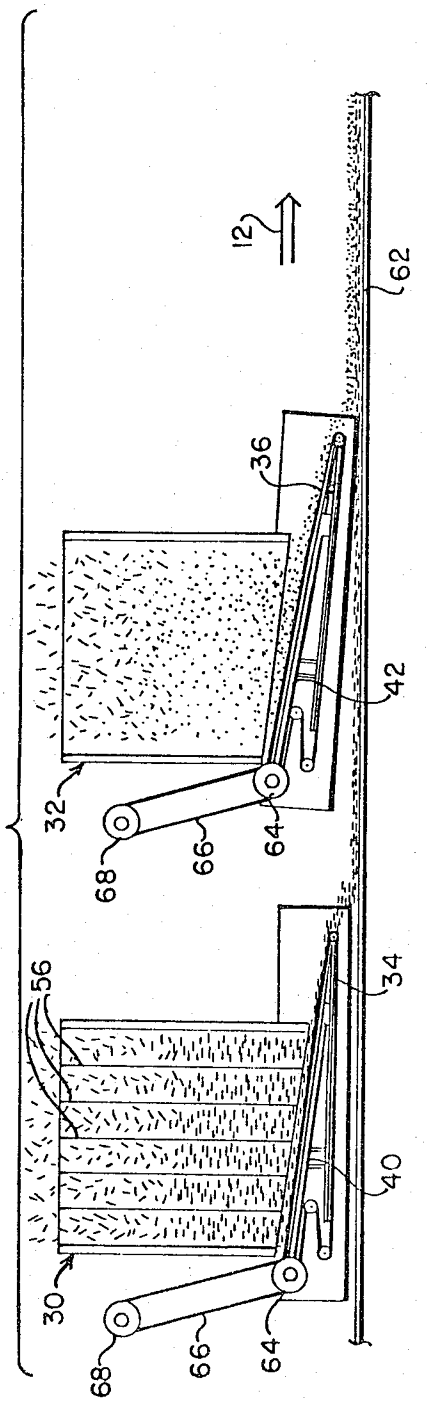
FIG. 4 is an elevation schematic view.

FIGS. 3 and 4 show in schematic form the function of the in-line orientation cell 30 and the cross-machine orientation cell 32. The in-line electrostatic orientation cell 30 includes a plurality of vertically aligned plates 56 extending in the cross-machine direction 14. Each of the vertical plates is charged with an appropriate potential such that an electric field is established between adjacent plates to electrostatically align the particles in the machine direction as they free-fall through the orientation cell. The magnitude of the voltage gradient between the spaced electrode plates, just above and along the transfer belt 34 positioned beneath the electrically charged plates, and between the transfer belt 34 and the mat-receiving surface or caul 54 may vary depending on numerous factors, such as the type, size, shape and moisture content of the material being used. Voltage gradients ranging between 1 kV/in and 12 kV/in may be used. Preferably, direct current is used, although alternating current may be used.

The cross-machine electrostatic orientation cell 32 includes a plurality of vertically aligned plates 60 which extend along the in-line direction 12. Particles freely falling through the cross-machine orientation cell 32 align themselves in the cross-machine direction 14, as indicated in FIGS. 3 and 4.

Figure 5:
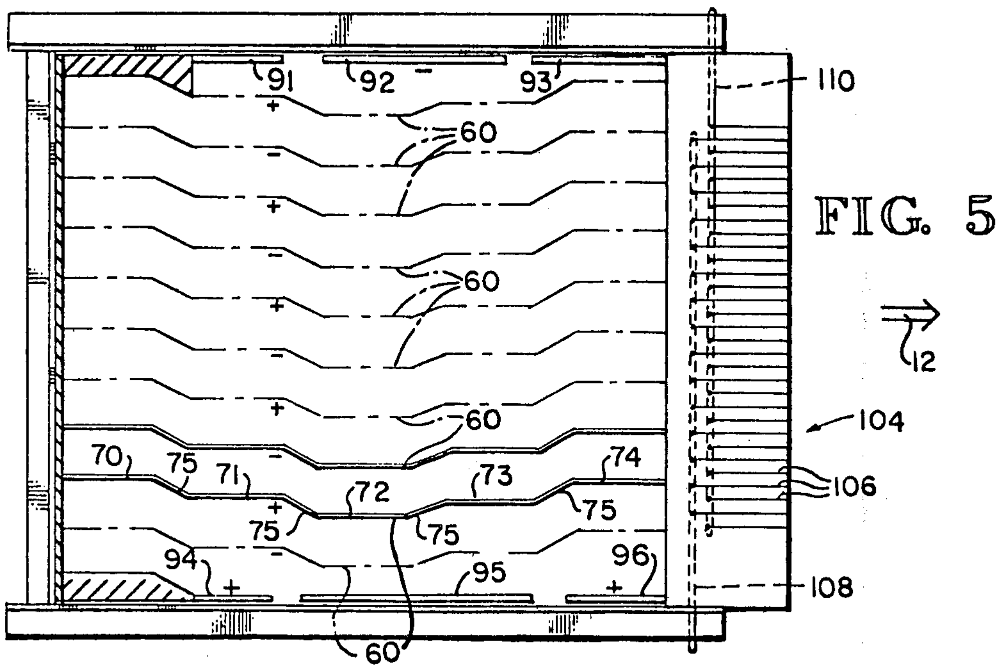
FIG. 5 is a sectional view taken along section line 5—5 of FIG. 1.

FIG. 5 shows one configuration of the cross-machine plates 60 which may be used. The plates 60 are each formed substantially alike and have a plurality of parallel planar sections 70, 71, 72, 73, 74 aligned in the in-line direction 12; that is, parallel to the direction of movement of the mat being formed. The planes of each of the planar sections 70, 71, 72, 73, 74 are each offset from the other in order to minimize the shadow effect of the particles being deposited on the mat passing beneath the lower ends of he plates. The offset displacement of each of the planar sections minimizes the basis weight distribution of material over the mat area such that no planar section aligns with any other planar section along the same parallel line extending in the direction of the in-line direction 12. The non-parallel portions 75 of the plates are obliquely positioned with respect to the in-line direction 12. The respective vertical end plate electrodes (see FIG. 5) are broken into sections 91, 92, 93 and 94, 95, 96, as illustrated. A lower degree of particle orientation is achieved in the cross-direction by the plate configuration shown, but the average deviation of particles over the mat surface substantially approaches the desired alignment and the basis weight variation over the area of the mat is minimized.

The transfer belts 34, 36 positioned below the respective orientation cells 30, 32 are coupled to sheaves 64, which are, in turn, driven through belt 66 from control motor 68.

The insulated inclined transfer conveyor deck 40 beneath the in-line electrostatic orientation cell 30 includes a plurality of conductive rods (not shown) embedded in slots formed in the surface of the plate 40, each of the rods aligned with the lower edges of each of the plates 60 and preferably maintained at the same potential and polarity as each corresponding plate, as described in application Ser. No. 106,686, now U.S. Pat. No. 4,347,202 the disclosure of which is incorporated herein by reference. It is also desirable to embed a conductive rod 58 (see FIG. 3) about half the distance between the last vertically charged plate at the discharge end of the orientation cell and the end of the transfer conveyor deck to aid in maintaining the strength of he electrical field and alignment of the particles making up the mat on the transfer belt 34.

Figure 6:
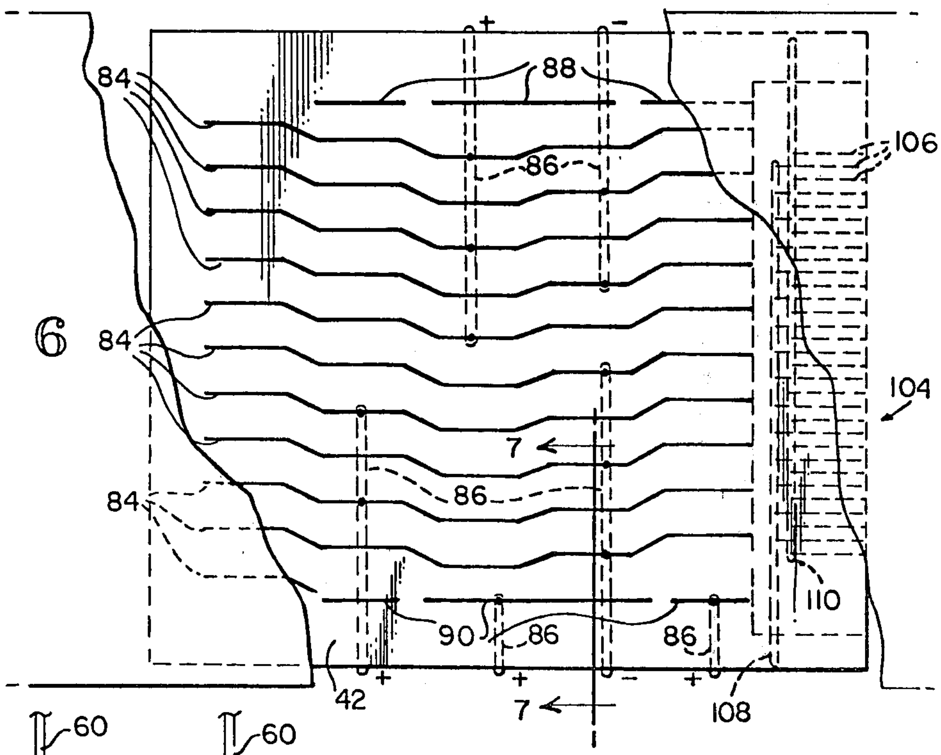
FIG. 6 is a plan view of the deck of the transfer conveyor used beneath the cross-machine orientation plates.
Figure 7:
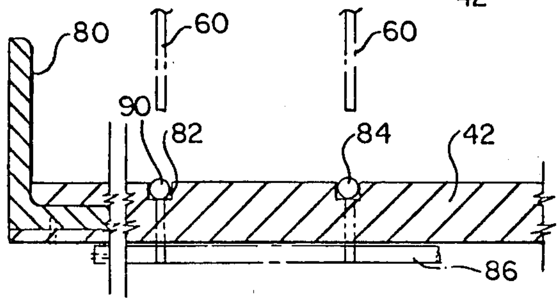
FIG. 7 is a sectional view taken along line 7—7 of FIG. 6.
Figure 10:
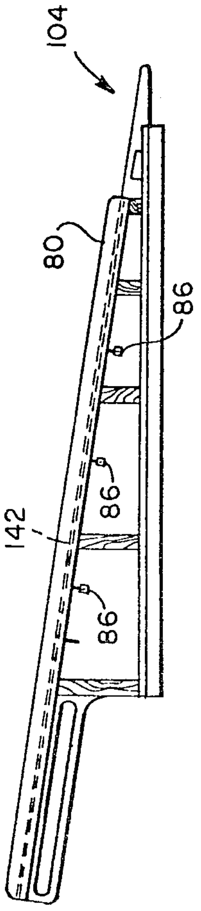
FIG. 10 is a vertical cross-section of the cross-machine transfer conveyor deck of FIG. 6 showing the nosepiece mounted on the discharge end of the conveyor deck.

FIGS. 6, 7, and 10 illustrate plan and cross-sectional views of the insulated inclined transfer conveyor deck 42 for the cross-machine electrostatic orientation cell 32. The transfer deck 42 is formed of an electrically insulating material, such as glass fiber-reinforced resin, and has parallel side flange portions 80 on each side thereof. Along the inner surface of the deck 42 are a series of channels or slots 82 in which electrically conductive rods 84 are embedded, the rods having the same offset configuration as the offset, vertically spaced plates 60 located directly above the conveyor deck. The rods 88 and 90 at each end of the deck have the same configuration as plates 91–96.

Figure 8:
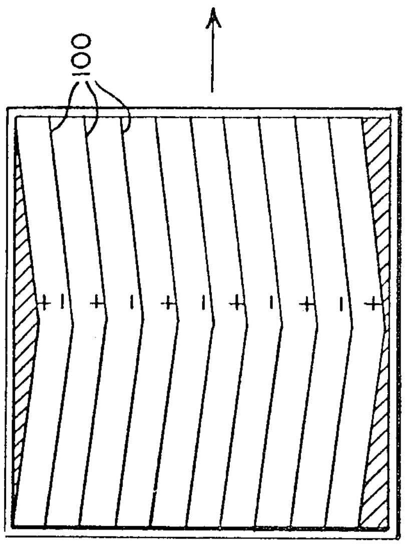
FIGS. 8 and 9 are plan views of alternative electrode configurations embedded in a conveyor deck for cross-machine orientation, the conveyor deck not including the nosepiece.

The conductive rods 84, 88 and 90 embedded in the slots are electrically connected to one another and to a source of electrical potential by suitable connector bars 86 extending beneath the conveyor deck 42 at right angles to the length dimension of the rods 84, 88 and 90. A nosepiece 104, to be described more fully later, is secured to the discharge end of the conveyor deck as illustrated in FIG. 8.

Referring to FIG. 2, the transfer conveyor decks 40 and 42 are pivotally mounted at points 48 and 50 just above the axis of sheave 64 beneath the respective orientation cells 30 and 32. The distance between the transfer conveyors 40 and 42 and mat conveyor 54 may be adjusted by adjustment of jackscrew sets 44 and 46 to adjust the thickness of the mat on the caul. The degree of inclination of the respective transfer conveyor decks relative to the caul 54 is adjusted with jackscrews 52 to change the distance between the electrode plates and transfer conveyor decks at the discharge end.

Figure 9:
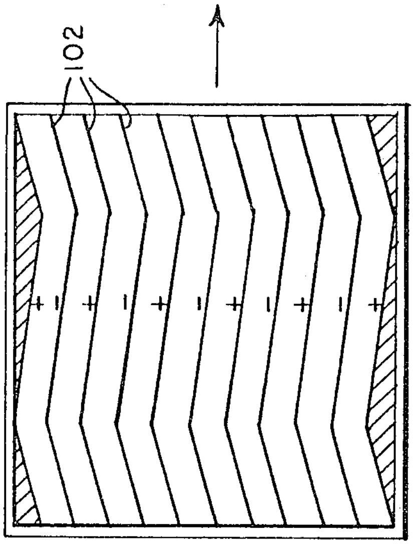

Rather than the configuration of the plate electrodes of the orientation cell shown in FIG. 5, other electrode patterns may be used (see FIGS. 8 and 9) wherein the electrodes are offset from the cross-machine direction to spread the effect of electrode location over the area of orientation to minimize basis weight variation. The configuration of the electrodes should be such as to minimize the average angle deviation from the desired perpendicular direction to the machine direction. In FIG. 8, the vertically spaced electrode plates 100 have a generally chevron configuration. In FIG. 9, the spaced electrode plates 102 have a double chevron configuration. Other configurations may also be used. The configuration of the electrodes embedded in the transfer conveyor deck should conform to that of the vertically spaced electrodes.

Figure 11:
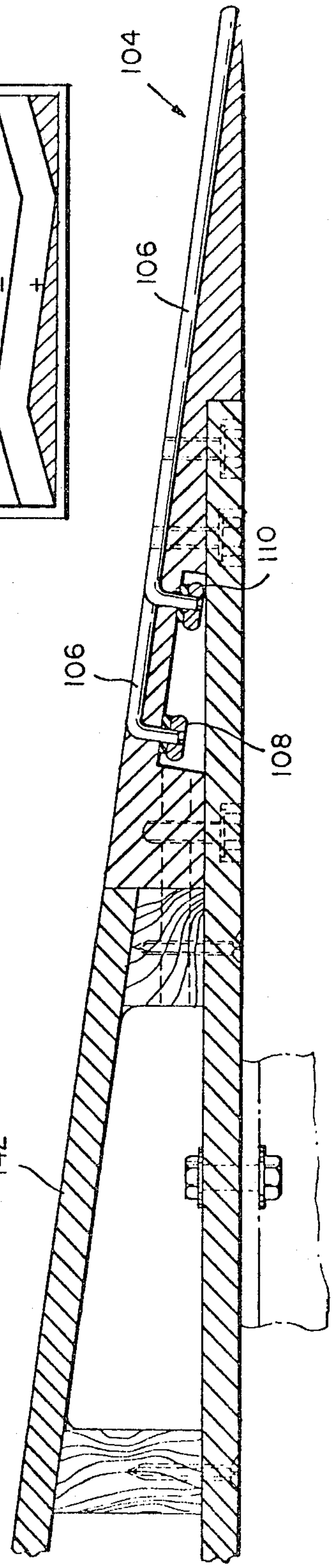
FIG. 11 is an expanded vertical cross-section view of the nosepiece of the cross-machine transfer conveyor of FIG. 5.

FIG. 11 illustrates a cross-section of the nosepiece 104 of the conveyor deck for the cross-orientation cell which is fabricated from a piece of a substantially electrically non-conductive material having a series of parallel slots or grooves formed in the upper surface thereof at spaced intervals. These grooves receive rod electrodes 106, as illustrated in FIG. 11, each of the rod electrodes connected to respective connector bars 108 and 110. The connector bars are electrically connected to a source of electrical potential to deliver electrical charges of different potential to adjacent electrodes in a similar manner as electrical power is delivered to the rods embedded in the conveyo deck. The conductive elements embedded in the nosepiece extend parallel to the direction of movement of the transfer belt and are alternately charged positive and negative, with the electrical potentials running from 1 kV/in to 12 kV/in. The function of the nosepiece is to produce an electrical field immediately around the nosepiece which is perpendicular or transverse to the direction of movement of the transfer belt so that as the lignocellulosic particles are transferred from the transfer belt to the caul belt, they remain under the influence of the electrostatic field and remain oriented, particularly those particles on the lower surface of the mat formed on the transfer belt.

The electrostatically align particles in the cross-machine direction, the particles are uniformly distributed over the inlet area of the cross-machine orientation cell 32 utilizing a particle distributor 28. A high-voltage, electrostatic orienting field is established between the adjacent plates 60 of the orientation cell 32, with the plates 60 being uniformly spaced at points positioned essentially transverse to the in-line direction 12. The plates 60 have portions 70, 71, 72, 73, 74 which are parallel to the in-line direction. The high-voltage field between the pairs of plates electrostatically orients the particles cascading therebetween so that the particles are aligned parallel to the field and deposted as aligned on the transfer belt 36. The mat formed on the transfer belt is then moved to transfer the formed mat to the caul 54.

It is desirable to run the transfer conveyor belt 36 of the cross-orientation cell 32 at a higher speed than the caul 54 in order to crowd the particles making up the mat as they are being transferred from the transfer belt to the caul. The crowding helps reduce particle misalignment during transfer. The transfer belt 36 is generally run 1–10% faster than the cual 54. It is also desirable to run the transfer conveyor belt 34 of the in-line orientation cell 30 at a slower speed than the caul 54 to pull the particles in alignment as they are being transferred from the transfer belt 34 to the caul.

While particular embodiments of the invention have been shown and described, it should be understood that the invention is not limited thereto since many modifications may be made. It is therefore contemplated to cover by the present application any and all such modifications that fall within the true spirit and scope of the underlying claims.

We claim:

1. An apparatus for electrostatically forming a continuous mat of directionally oriented lignocellulosic particles and depositing them on a movable mat-receiving surface in a direction substantially transverse to the length dimension of the mat-receiving surface, comprising:

an orienting zone having means establishing a first directional electric field substantially transverse to the length dimension of the movable mat-receiving surface for electrostatically orienting a multitude of lignocellulosic particles passing therethrough in the direction of the electrical field, the means configured to minimize the basis weight distribution of the lignocellulosic material deposited on the mat-receiving surface; and a mat-receiving surface positioned beneath the orienting zone receiving the aligned lignocellulosic particles thereon to form a mat.

2. The apparatus of claim 1 wherein the mat-receiving surface is an electrically conductive surface maintained at ground potential movable in a direction parallel to its length dimension and wherein the machine includes an electrically non-conductive transfer surface positioned between the orienting zone and the mat-receiving surface to receive the aligned lignocellulosic particles thereon to form a mat thereof for transfer to the mat-receiving surface, and means producing a directional electrical field immediately above the mat formed on the transfer surface substantially transverse to the direction of movement of the mat-receiving surface.

3. An apparatus for forming a continuous mat of directionally oriented lignocellulosic particles and depositing them on a mat-receiving surface, the mat of particles oriented and deposited on the mat-receiving surface in a direction substantially transverse to the direction of movement of the mat-receiving surface, comprising:

an electrically insulated transfer surface receiving a multitude of lignocellulosic particles thereon in overlapping relation to form a mat, the transfer surface having a discharge end, a mat-receiving surface positioned adjacent the discharge end of the transfer surface receiving the particles deposited on the transfer surface to form a mat thereof, means for moving the mat-receiving surface beneath the transfer surface to receive the mat thereon, means for causing an electrical current to flow within the mat formed on the transfer surface to produce a directional electrical field substantially transverse to the direction of movement of the mat-receiving surface tending to align the longer dimension of the particles making up the mat in the direction of the electrical field, an orienting zone positioned above the transfer surface having means establishing a directional electrical field substantially parallel to the direction of the electrical field produced immediately above the mat formed on the transfer surface and substantially transverse to the direction of movement of the mat-receiving surface for aligning the longer dimension of the particles making up the mat before their deposition on the transfer surface, the means configured to minimize the basis weight distribution of the lignocellulosic material deposited on the mat-receiving surface, and means for transferring the aligned mat from the transfer surface to the mat-receiving surface.

4. The apparatus of claim 3 wherein the orienting zone includes a plurality of vertically extending, spaced-apart, electrically conductive plates, with adjacent plates charged with different electrical potentials providing an electrical field therebetween for electrostatic alignment of the particles to be deposited on the transfer surface, the plates being in parallel alignment with each other and extending substantially in the direction of movement of the mat-receiving surface, but at an angle thereto sufficient to minimize the effect of electrode location on weight distribution of particles over the mat area.

5. The apparatus of claim 4 wherein the conductive plates have a plurality of planar sections aligned parallel to the direction of movement of the mat-receiving surface and offset from each other such that no planar section aligns with another planar section in the same vertical plane extending in the direction of movement of the mat-receiving surface so as to distribute the effect of the electrical potentials on the plates upon the particles passing between the plates over the area of the mat and to balance the distribution of particles over the area of the mat.

6. The apparatus of claim 4 wherein the length dimension of the conductive plates has the configuration of a chevron.

7. The apparatus of claim 4 wherein the length dimension of the conductive plates has the configuration of a double chevron.

8. The apparatus of claim 3 wherein the means for transferring the aligned mat is an electrically insulated transfer belt for moving the mat along the transfer surface to discharge the formed mat onto the mat-receiving surface.

9. The apparatus of claim 8 wherein the transfer surface has electrically conductive elements embedded therein, with each element vertically aligned with the lower edges of one of the conductive plates.

10. The apparatus of claim 5 wherein adjacent plates are spaced apart a substantially uniform distance measured transverse to the direction of movement of the mat so that a substantially uniform field strength is maintained between adjacent plates.

11. The apparatus of claim 3 wherein the orienting zone includes a plurality of vertically extending, spaced-apart, electrically conductive plates, with adjacent plates charged with different electrical potentials providing an electric field therebetween for electrostatically aligning particles deposited on the mat, said plates having a plurality of planar sections aligned parallel to the length dimension of the mat-receiving surface and laterally offset from each other such that no planar section aligns with another planar section in the same vertical plane extending parallel to the length dimension of the mat-receiving surface so as to distribute the effect of the electrical potentials on the plates over the area of the mat formed beneath the plates and to balance the distribution of particles over the area of the mat.

12. The apparatus of claim 9, including an electrically non-conductive nosepiece secured to the discharge end of the transfer surface around which the transfer belt is trained, the nosepiece including a plurality of spaced, electrically conductive elements embedded therein across the width thereof parallel to the direction of movement of the transfer belt, with adjacent elements having different electrical potentials impressed thereon and providing an electrical field substantially transverse to the direction of movement of the transfer belt to maintain the orientation of the particles making up the mat as the mat is transferred from the transfer belt to the mat-receiving surface.

13. An apparatus for forming a multilayered mat of directionally oriented lignocellulosic particles, each layer made up of particles oriented in a direction substantially transverse to the direction of orientation of the particles making up the adjacent contiguous mat, comprising:

a movable mat-receiving surface, a first orienting zone above the mat-receiving surface having first means establishing a first directional field extending parallel to the direction of movement of the mat-receiving surface for electrostatically aligning a multitude of lignocellulosic particles passing therethrough in the direction of the first directional field for deposit as a first mat of aligned particles on the mat-receiving surface, and a second orienting zone above the mat-receiving surface downstream from the first orienting zone having second means establishing a second directional field extending substantially transverse to the direction of movement of the mat-receiving surface for electrostatically aligning a multitude of lignocellulosic particles passing therethrough in the direction of the second electric field for deposit as a second mat over the first formed mat on the mat-receiving surface, the second means configured to minimize the basis weight distribution of the lignocellulosic material deposited on the mat-receiving surface.

14. The apparatus of claim 13, including respective electrically insulated transfer surfaces, one positioned beneath each orienting zone to receive the lignocellulosic particles thereon for transfer to the mat-receiving surface.

15. The apparatus of claim 14, including respective electrically insulated transfer belts trained about each transfer surface to move the respective aligned mats formed thereon onto the mat-receiving surface.

* * * * *